(12) United States Patent
Contreras et al.

(10) Patent No.: US 9,117,469 B1
(45) Date of Patent: Aug. 25, 2015

(54) SUSPENSION DESIGN WITH SPLIT SUBSTRATE FOR IMPROVED INTERFERENCE SIGNAL IMMUNITY

(71) Applicant: HGST Netherlands B.V., Amsterdam (NL)

(72) Inventors: John Contreras, Palo Alto, CA (US); Albert John Wallash, Morgan Hill, CA (US); Rehan Ahmed Zakai, San Ramon, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/557,380

(22) Filed: Dec. 1, 2014

(51) Int. Cl.
*G11B 5/55* (2006.01)

(52) U.S. Cl.
CPC .......................................... *G11B 5/55* (2013.01)

(58) Field of Classification Search
CPC ........... G11B 5/55; G11B 21/08; G11B 21/24
USPC ....................................................... 360/264.2
See application file for complete search history.

(56) References Cited

U.S. PATENT DOCUMENTS

| | | | |
|---|---|---|---|
| 5,666,717 A | 9/1997 | Matsumoto et al. | |
| 5,694,270 A | 12/1997 | Sone et al. | |
| 5,805,382 A | 9/1998 | Lee et al. | |
| 5,839,193 A | 11/1998 | Bennin et al. | |
| 6,028,748 A | 2/2000 | Kuroe et al. | |
| 6,088,235 A | 7/2000 | Chiao et al. | |
| 6,326,553 B1 * | 12/2001 | Yim et al. | 174/254 |
| 6,476,332 B1 * | 11/2002 | Shangguan | 174/261 |
| 6,608,736 B1 | 8/2003 | Klaassen et al. | |
| 7,059,868 B1 | 6/2006 | Yan | |
| 7,079,357 B1 | 7/2006 | Kulangara et al. | |
| 7,218,481 B1 * | 5/2007 | Bennin et al. | 360/294.4 |
| 7,440,236 B1 * | 10/2008 | Bennin et al. | 360/294.4 |
| 7,701,674 B2 | 4/2010 | Arai | |
| 7,839,604 B1 * | 11/2010 | Coffey et al. | 360/265.9 |
| 8,094,413 B1 | 1/2012 | Hentges | |
| 8,179,639 B2 * | 5/2012 | Klarqvist et al. | 360/245.9 |
| 8,189,281 B2 * | 5/2012 | Alex et al. | 360/46 |
| 8,233,240 B2 | 7/2012 | Contreras et al. | |
| 8,395,866 B1 * | 3/2013 | Schreiber et al. | 360/245.9 |
| 8,553,364 B1 * | 10/2013 | Schreiber et al. | 360/245.9 |
| 8,638,645 B1 | 1/2014 | Nishijima et al. | |
| 2007/0253115 A1 * | 11/2007 | Yao et al. | 360/294.4 |
| 2010/0220414 A1 * | 9/2010 | Klarqvist et al. | 360/245.8 |
| 2011/0149441 A1 * | 6/2011 | Alex et al. | 360/245.8 |
| 2012/0033319 A1 * | 2/2012 | Contreras et al. | 360/39 |
| 2014/0055885 A1 | 2/2014 | Ando et al. | |

* cited by examiner

*Primary Examiner* — Allen T Cao
(74) *Attorney, Agent, or Firm* — G. Marlin Knight (57) ABSTRACT

A "split-substrate" design is described for the metal ground layer in the suspension for a slider for use in a disk drive that reduces crosstalk from signals being transmitted on the conductive traces and allows externally induced interference to be shunted away from sensitive traces along selected portions of the suspension. In embodiments of the invention a slit formed in the metal ground layer to provide two parallel ground paths respectively on the left and right sides of the selected portion of the suspension. By positioning interference signal generating traces like writer traces on one side of the slit, that side becomes the noisy ground path leaving the other side as a "quiet" ground path. The shape, positioning and grounding of the split substrate structure can shunt return/ground currents created by external RFI into the noisy leg and thereby shield the quiet leg.

16 Claims, 4 Drawing Sheets

SUSPENSION DESIGN WITH SPLIT SUBSTRATE FOR IMPROVED INTERFERENCE SIGNAL IMMUNITY

FIELD OF THE INVENTION

Embodiments of the invention relate generally to the design of integrated lead suspension (ILS) for sliders used in disk drives and more particularly to techniques for designing the substrate on the suspension to reduce crosstalk and signal coupling from extrinsic electromagnetic sources.

BACKGROUND

Figure 1:
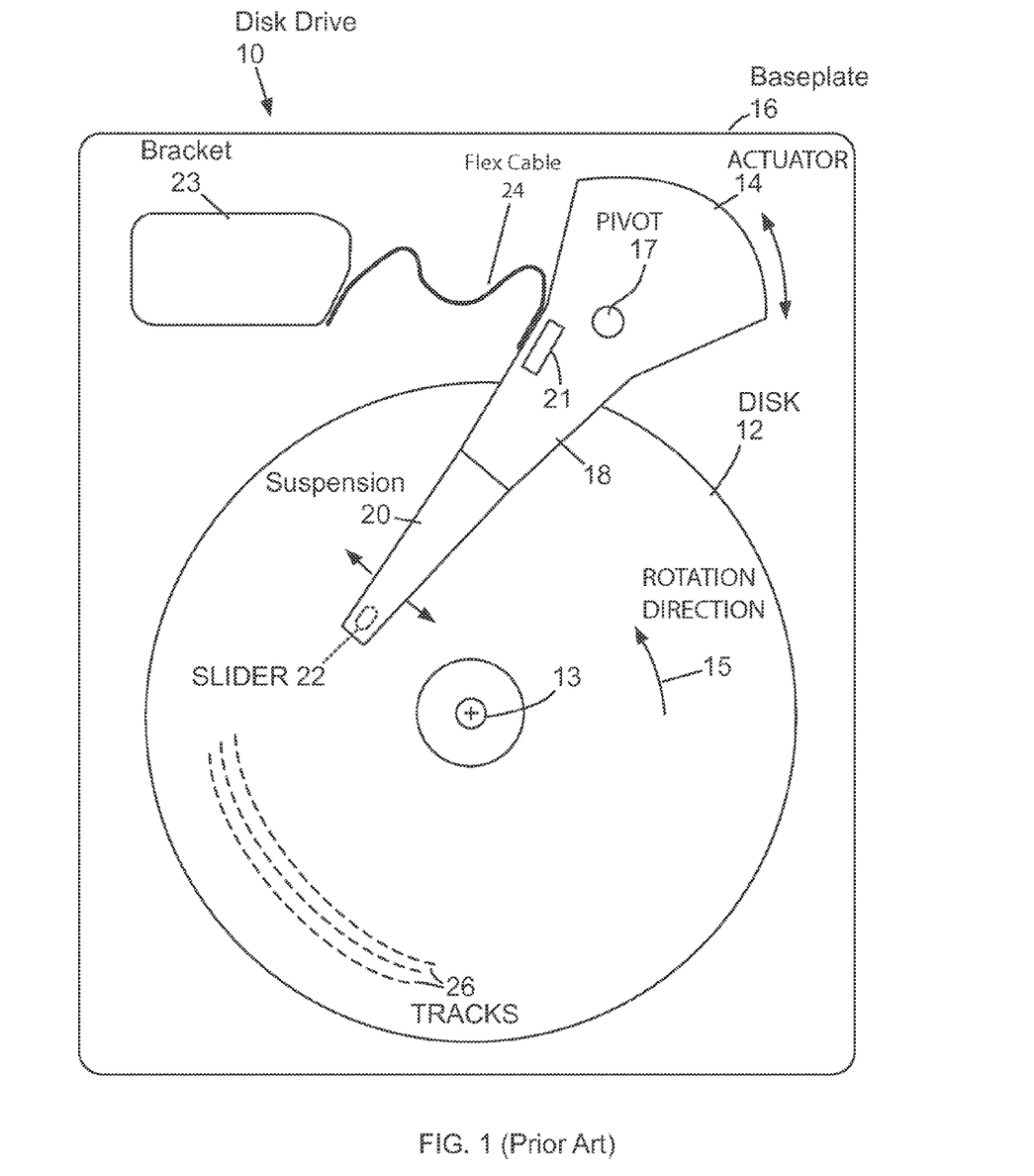
FIG. 1 is an illustration of selected components of a disk drive according to the prior art.

FIG. 1 is an illustration of selected components of a disk drive 10 according to the prior art. The disk drive includes at least one magnetic recording disk 12 that rotates on spindle 13 in direction 15 driven by a spindle motor (not shown). Housing or baseplate 16 provides support for the components. The upper portion of the outer protective case, which is present for normal operation, is removed for this illustration. The data is recorded in concentric or spiral data tracks 26 that are generally circular. Only a small sample of the many tracks are shown. In practice there are thousands of tracks that extend 360 degrees around the disk. The disk drive includes actuator 14 that pivots on pivot point 17 driven by a rotary voice coil motor (VCM) (not shown). The actuator 14 includes a rigid actuator arm 18. A flexible wiring cable 24, which is usually called the "flex cable," connects the devices on the actuator including read and write heads (not shown) in the slider 22 and the read/write integrated circuit chip (R/W IC) 21 shown) to the drive's electronics (not shown). The R/W IC 21, which is also variously called the arm electronics IC, preamplifier chip or preamp, is typically mounted on the actuator arm or integrated into the flex cable. A suspension 20, which is attached to the end of arm 18, includes a flexure/gimbal element (not shown) on which the air-bearing slider 22 is mounted to allow flexible movement during operation. As the disk 12 rotates, the slider with read/write heads is positioned over a track to read and write the magnetic transitions. Disk drives often have more than one disk mounted on the spindle and the upper and lower surfaces of each disk can have magnetic recording material thereon, and the actuators with components mounted thereon are replicated as needed to access each of the recording surfaces.

The flex cable 24 provides electrical connections between the actuators and the drive electronics on a circuit board (not shown). The flex cable 24 is rigidly attached by stationary bracket 23 at one end, which connects to drive electronics. The other end of the flex cable is attached to the set of actuators 14 which move in unison in response to the VCM.

A plurality of electrical paths (not shown) extend from the flex cable along the actuators to the arm electronics chip 21. The arm electronics chip is in turn connected by a plurality of electrical paths that extend through the suspension 20 and connect to the slider 22 as further illustrated in FIG. 2. These electrical paths are typically called traces 31 and are made of copper. The load beam structure of the suspension is a spring metal layer. The tail end of the suspension has a set of tail termination pads 33 for electrical connection to the corresponding traces 31. The traces carry the signals for the reader (read head), writer (write head) in the slider, as well as any additional signals required for fly height control, heater, etc. The example suspension in FIG. 2 has 8 termination pads that provide connection to 8 slider connection pads 35 that are in turn connected to the slider (not shown) at the slider (or head) end 20H of the suspension. Higher or lower numbers of pads and corresponding traces can be used. The traces can vary in width and additional structures/features can be included in the paths to control electrical parameters such as impedance. Dielectric material separates the traces from the spring metal layer and a covering layer dielectric material is typically deposited over the traces. Subtractive and/or additive photo-lithography, deposition and etching processes can be used to manufacture suspensions and form the traces.

Typically the spring metal layer in the suspension has been used as a ground plane for the traces. Because of the spatial constraints imposed on the suspension a multi-layer or stacked trace configurations have been used. Klaassen et al. in U.S. Pat. No. 6,608,736 disclose stacked read line traces arranged on top of each other and separated from each other by a dielectric layer and separated from the stainless steel base layer by another dielectric layer.

In U.S. Pat. No. 7,701,674 to Hajime Arai (Apr. 20, 2010) a suspension with an enhanced high conductivity ground layer trace under the write traces is described, which lowers the write trace impedance and lower signal transmission loss. The high conductivity ground layer is formed by plating copper directly onto the stainless steel substrate prior to the formation of the write traces and is, therefore, not electrically separated from the stainless steel. The high conductivity ground layer can be a single or double trace. Arai notes that the high conductivity ground layer may be extended to the area of the heater wires unless the impedance of the read wires is thereby decreased.

U.S. Pat. No. 8,094,413 to Hentges, et al. Jan. 10, 2012 describes a disk drive head/slider suspension flexure with stacked traces having differing configurations on the gimbal and beam regions. A head suspension is described that includes integrated lead suspension flexure having stacked traces that run along one side of the spring metal layer and multi-layer traces that run along the other side. The traces come together in the tail region of the suspension where the set termination pads provide electrical connection to the system. The head suspension component includes stacked traces having first and second traces in the first and second conductor layers, respectively. The stacked traces are used for the writer in an embodiment and the multilayer traces are used for the reader and fly height traces and include a ground layer.

U.S. Pat. No. 8,233,240 to Contreras, et al. Jul. 31, 2012 describes an integrated lead suspension (ILS) in a magnetic recording disk drive has the transmission line portion of the ILS between the flex cable termination pads at the tail and the gimbal area formed of multiple interconnected segments, each with its own characteristic impedance. At the interface between any two segments there is a change in the widths and in impedance of the electrically conductive traces of the transmission line. The number of segments and their characteristic impedance values are selected to produce the largest frequency bandwidth with a substantially flat phase delay from the write driver to the write head.

U.S. Pat. No. 6,088,235 issued to Chiao, et al. Jul. 11, 2000 describes a method of magnetic interference (noise) cancellation in a single-ended MR preamplifier front end using a balanced ground return path in a flex circuit connecting an MR head to the front end of the preamplifier. The pattern of conductive traces includes a signal path extending from a trace pad aligned with the preamplifier signal input pin to a distal signal input connection pad for connecting to a head and a plurality of ground return paths leading from a vicinity of the distal signal input connection pad to the at least two ground pins. The plurality of ground return paths are so arranged that a common mode interference induces currents in opposite directions in the ground return paths. The interference currents are therefore combined and canceled at a preamplifier connected to the preamplifier signal input pin within the integrated circuit. The balanced ground return path introduces a interference current in the opposite direction of the original interference current as viewed at the signal input pins of the preamplifier chip. In this manner common mode rejection of the radiated interference component is restored in the single-ended MR preamplifier circuit arrangement.

Although stainless steel has advantages a structural material for suspensions, conductive traces for the read signal from the read head in a slider are highly susceptible to interference signal coupling onto the read signal path and degrading the SNR signals performance. Systems that include sliders with multiple read heads for two dimensional magnetic recording (TDMR) are expected to use single-ended preamplifiers and to be more sensitive to extrinsic interference signals. Two main sources of interference onto the stainless steel suspensions are 1) crosstalk from the write signal; and 2) radio frequency interference (RFI) that leaks into a disk drive's enclosure from external sources. In current designs all traces (sensitive reader traces, as well as, interference-signal insensitive traces), share the same signal return path to ground though the stainless steel layer.

SUMMARY OF THE INVENTION

Embodiments of the invention use a "split-substrate" design for the metal substrate/ground layer in the suspension that reduces interference signal transfer between the split portions (legs) of the ground layer. The split-substrate design reduces crosstalk from signals being transmitted on the conductive traces and allows external interference signals to be shunted away from sensitive traces along selected portions of the disk drive suspension. A split-substrate segment of the metal ground layer is formed with a dielectric slit that provides local electrical separation to split the ground currents into separate local paths. In embodiments of the invention a slit that is an air gap is formed in the metal ground layer (e.g. stainless steel layer) to provide two parallel ground paths respectively on the left and right sides (legs) of the selected segment of the suspension. By positioning interference-signal-generating traces like writer traces over one leg, that side becomes the interference signal's ground return ("noisy") path leaving the other side as a "quiet" ground path. The interference-sensitive traces such as the read signals are positioned over the metal ground layer on the "quiet" side of the central slit so that they are isolated from interference generated by the traces on the other side of the slit. The conductive signals traces are separated from each other and the metal (e.g. stainless steel) layer by layer(s) of dielectric material.

The split-substrate paths can be connected at the slider end, the tail end, or both ends of the suspension in alternative embodiments. In another embodiment the split-substrate paths can be kept floating, away from the interference signal's ground return path. In one embodiment the slit in the metal ground layer extends from the tail end of the suspension along a substantial portion of the length of the stainless steel layer and ends before the slider connection pad area. This embodiment provides substantial crosstalk and external RFI interference signal reduction without causing unnecessary increases in manufacturing difficulty or reductions in the mechanical strength of the suspension.

The shape and positioning (geometry) of the split-substrate structure can also be designed to enhance shunting of external RFI interference signal return away from the quiet leg of the ground return layer. In one embodiment the interference signal ground leg has a shape that partially curves around the terminal portion of the quiet leg and is positioned to shunt RFI interference signals' return currents away from the quiet leg. In alternative embodiments the noisy leg of the split substrate can be connected to the base plate ground to provide a lower impedance path for shunting of external RFI interference signal return.

DETAILED DESCRIPTION OF THE INVENTION

Figure 3A:
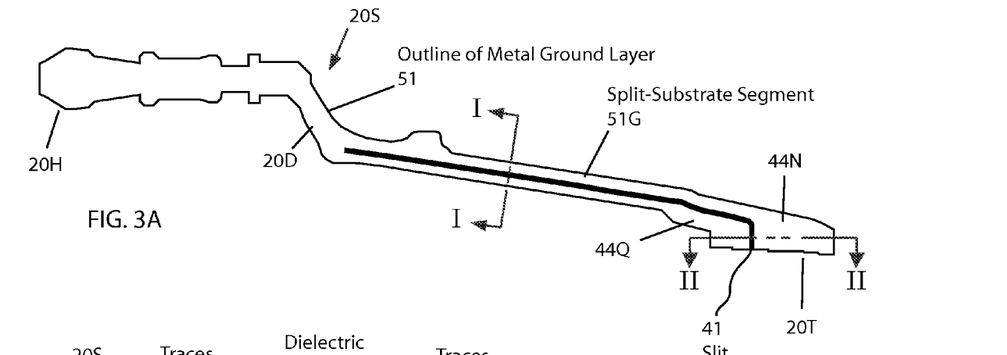
FIG. 3A is an illustration of an illustration of a top view of a suspension according to an embodiment of the invention showing the outline of the metal ground layer with a slit that forms the split substrate.

Except as described below the multiple layers of the suspension according to an embodiment of the invention can be designed and manufactured according to the prior art. FIG. 3A is an illustration of an illustration of a top view of a suspension 20S according to an embodiment of the invention showing the outline of the metal ground layer 51, which can be the typical stainless steel used in the prior art, with a slit 41 that forms the split-substrate segment 51G. The invention does not require that metal ground layer be stainless steel. The metal ground layer 51 is shown only in outline for simplicity. A practical embodiment as known to those skilled in the art will have many windows and holes, which are not shown. The width of the slit has been exaggerated for clarity, but the relative length and positioning of the slit approximately correct for a practical embodiment of the invention.

The "split-substrate" design for the metal layer 51 in the suspension reduces crosstalk and allows interference to be shunted away from sensitive traces along selected portions of the disk drive suspension that conduct signals to and from the heads in the slider. The metal ground layer is connected the system ground as in the prior art.

In various alternative embodiments the ground paths can be connected at either the slider end, the tail end, both ends, or kept floating with respect to the system ground, i.e. kept away from system ground. In the embodiment shown in FIG. 3A the split-substrate segment 51G formed by slit 41 in the metal substrate layer 51 extends from the tail end of the suspension along a substantial portion of the length of the metal substrate layer and ends before the slider connection pad area. The slit 41 creates two parallel ground current paths respectively on the two sides (legs 44N, 44Q) of the split-substrate segment 51G of the suspension. On one side of the slit 41, the upper or right leg 44N of split-substrate segment 51G creates one ground current path. On the other side of the slit 41, the lower or left leg 44Q of split-substrate segment 51G creates a second ground current path. The left and right legs and their ground current paths are joined on the slider end after the slit ends but are isolated from each other at the tail end in this embodiment. Thus the split-substrate segment 51G extends only along a selected portion of the length of the traces between the tail termination pads and the slider connection pads.

Figure 3B:
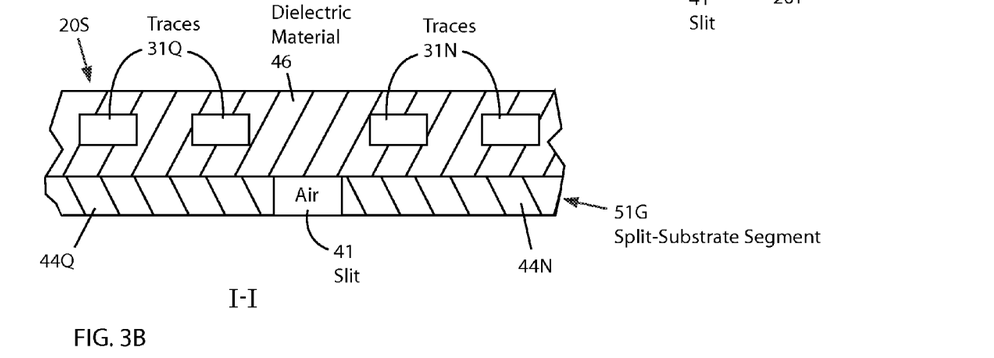
FIG. 3B an illustration of the cross section I-I from FIG. 3A of the suspension according to an embodiment of the invention showing the slit in the metal ground layer and selected traces.

FIG. 3B is an illustration of the section I-I view (marked in FIG. 3A) of a suspension 20S according to an embodiment of the invention. The slit 41 is an air gap and is not filled with the dielectric material, which generally separates and insulates the electrically conductive elements including the right and left legs 44N, 44Q of the split-substrate segment 51G and plurality of traces 31Q, 31N. Therefore, the slit 41 provides electrical insulation between the right and left legs 44N, 44Q. Alternatively the slit 41 can be filled with the dielectric material 46.

Only four traces are shown, but additional traces can be present on each side. The traces shown are all in a single plane, but as described above, stacking traces is known in the prior art and can be used with embodiments of the split substrate of the invention. The traces 31N in this embodiment are interference-generating traces like writer traces and are positioned together over "noisy" ground layer leg 44N. The traces 31Q in this embodiment include the interference-sensitive traces, like reader traces, and are positioned together over "quiet" ground layer leg 44Q. Traces for other signals such as heater current may not fall into either category and can be placed on either side.

By positioning interference-generating traces 31N on one side of the slit above the leg 44N as shown in FIG. 3B, that side becomes the noisy ground current path leaving the other side as a "quiet" ground current path. The interference-sensitive traces such as the read signals are positioned over the stainless steel layer on the "quiet" side of the central slit so that they are isolated from interference generated by the traces on the other side of the slit.

Figure 3C:
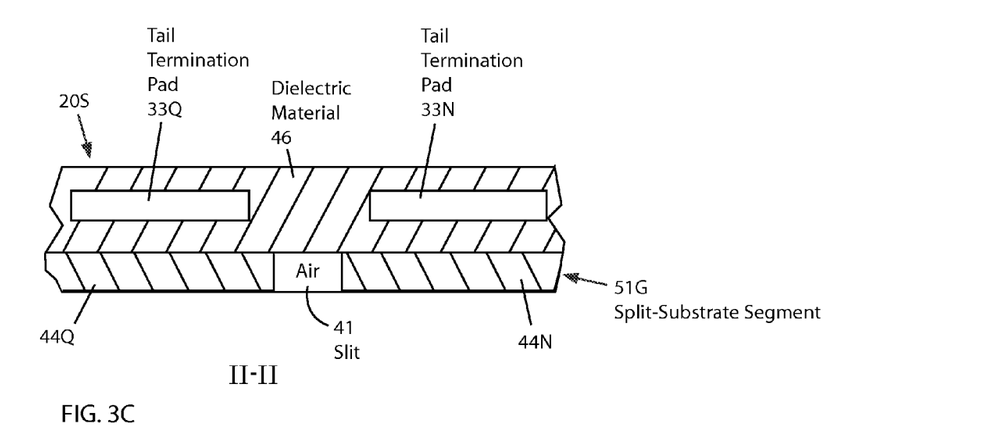
FIG. 3C an illustration of the cross section II-II from FIG. 3A of the suspension according to an embodiment of the invention showing the slit in the metal ground layer and selected tail termination pads.

FIG. 3C an illustration of the cross section II-II from FIG. 3A of the suspension according to an embodiment of the invention showing the slit in the metal ground layer and selected tail termination pads 33Q, 33N. The tail termination pads are extensions of the traces and are correspondingly positioned over the corresponding ground layer legs 44Q, 44N in tail area 20T.

Figure 2:
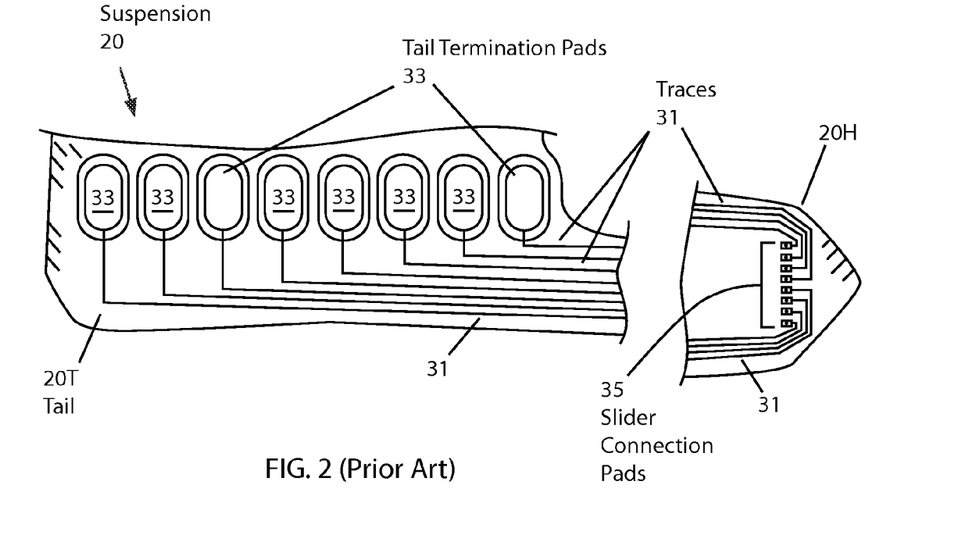
FIG. 2 is an illustration of a top view of a selected components of a prior art suspension with electrically conductive traces.

The external radio frequency interference (RFI) leaks into a disk enclosure and has a signal return path to the tail end 20T of the suspension, and therefore, the slit 41 begins at the tail end 20T and extends a substantial way toward the head end 20H. In this embodiment the slit extends for more than 50% of the length of the ground signal path between the tail termination pads and the slider connection pads, which are generally as illustrated in FIG. 2. For maximum crosstalk and RFI reduction, the split should extend as close as mechanically practical to the head end 20H of the suspension where the slider is located. However, significant interference reduction benefits can be obtained with a partial split as shown in the embodiment of FIG. 3A.

The reduction of crosstalk is a function of the length of the split in the ground layer, and, therefore, a longer slit is advantageous. In addition the split should be positioned where crosstalk is more likely to have the best effect. In the embodiment shown the slit extends through the longest, generally straight segment of the suspension, which is sufficient in the particular application to achieve substantial crosstalk reduction.

However, the slit may decrease mechanical strength of the suspension in some designs; therefore, for practical mechanical reasons, the slit in this embodiment ends before the dogleg-like offset 20D that occurs in the suspension. The length, width and positioning of the slit for a particular disk drive application can be determined by computer modeling or by empirical testing.

Figure 4:
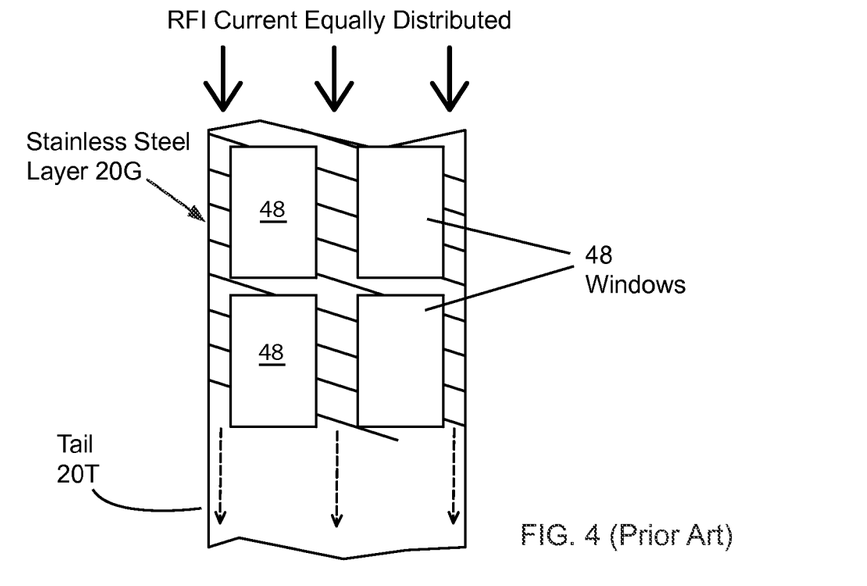
FIG. 4 is an illustration of interference current paths in a metal ground layer serving as a ground according to the prior art.
Figure 5:
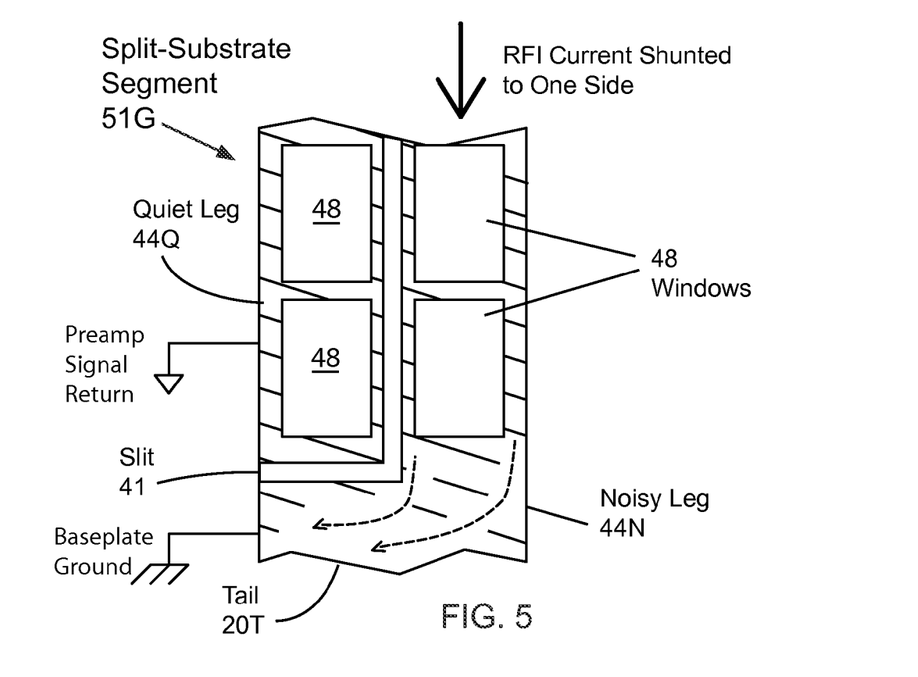
FIG. 5 is an illustration of interference current paths in a metal ground layer with a split substrate path according to an embodiment of the invention.

The principles of embodiments of the invention will be furthered discussed using FIGS. 4 and 5. FIG. 4 is an illustration of interference current path in a stainless steel layer 20G serving as a ground according to the prior art. In this view the plurality of windows 48 that are typically formed in the stainless steel layer are illustrated. Note that the plurality of windows 48 still allow the interference current, which is injected from the tail end 20T, to be equally distributed across the conductive material in the stainless steel layer 20G. The ground currents flow around the windows.

FIG. 5 is an illustration of interference current paths in a metal ground layer with a split-substrate segment 51G according to an embodiment of the invention. As noted the primary external radio frequency interference (RFI) that leaks into a disk enclosure typically returns to the tail end 20T of the suspension, and, therefore, in this embodiment the slit 41 begins at the tail end 20T and is formed with an initial segment that begins on the side of the suspension in the area of the suspension where the tail termination pads are located. The slit generally parallels/follows the paths of the traces, which include a significant angle (bend) just behind the tail pads. It should be noted that the slit (and therefore the length of the split-substrate segment) extends along and between a plurality of the windows 48. The slit in this embodiment extends between two rows of windows and the length of the slit is significantly greater than the corresponding dimension of the windows.

This positioning of the slit causes the end portion of right leg 44N of the ground layer to partially wrap around the left leg 44Q in the tail area 20T. The effect of this structure is that external radio frequency interference (RFI) current that is injected from the tail end 20H is differentially shunted by right leg 44N away from the left leg 44Q. The principle being illustrated is that the designated noisy leg of the split substrate structure can be positioned nearer the primary source of external RFI to provide a ground shunt to reduce the RFI current that flows in the quiet leg of the split substrate structure. In other embodiments where the source of external RFI is located in a different relative position, corresponding changes in the geometry of the split substrate structure can be used.

In alternative embodiments the quiet leg 44Q and the noisy leg 44N of the split substrate can be connected to different signal return/ground points to enhance external RFI interference signal shunting away from the quiet leg 44Q. For example, the quiet leg 44Q can be connected to the preamp signal return and the noisy leg 44N can be connected to the base plate (chassis) ground to provide a lower impedance path for shunting of external RFI interference signal as illustrated in FIG. 5.

Computer simulations of the split substrate embodiment described above assuming an external RFI (plane wave) injected from the tail end show a field to reader trace coupling up to about 5.5 GHz that is 10 dB lower than a comparable monolithic ground layer. At about 6 GHz the interference coupling was found to be approximately equal and then worsen for higher frequencies.

The invention claimed is:

1. A suspension for a slider for use in a disk drive comprising:
   a plurality of slider connection pads positioned in a head area of the suspension;
   a plurality of termination pads positioned in a tail area of the suspension;
   a plurality of electrically conductive traces that are separated by dielectric material and extend from the tail area to the head area that respectively provide electrical connection between a selected slider connection pad and a selected termination pad, with a selected one of the conductive traces extending along a first path between a selected slider connection pad and a selected termination pad and having a first length measured along the first path; and
   a metal substrate layer extending between the head area and the tail area, the metal substrate layer serving as a ground layer and being separated from the plurality of electrically conductive traces and the plurality of termination pads by dielectric material and including a split-substrate segment that is divided by a slit into first and second legs, the slit extending through the tail area and beyond the tail area along a selected portion of the first length toward the head area and ending before the head area, the slit providing local electrical isolation to separate ground currents in first and second legs into first and second local ground current paths, the first leg being positioned under at least one selected electrically conductive trace that conducts signals from a read head in the slider, and the second leg being positioned under at least one selected electrically conductive traces that conducts signals to a write head in the slider; and
   wherein the first and second legs of the split-substrate segment provide first and second local ground current paths respectively and thereby reduce electrical interference signal transfer between the first and second legs of the split-substrate segment.

2. The suspension of claim 1 wherein the split-substrate segment extends at least from the tail area adjacent to the plurality of termination pads along a substantial portion of the length of the metal ground layer between a selected one of the termination pads and a selected one of the slider connection pads.

3. The suspension of claim 1 wherein the split-substrate segment extends into the tail area and is disposed directly under at least two termination pads in the tail area.

4. The suspension of claim 1 wherein the split-substrate segment extends into the tail area with the first leg extending directly under at least two termination pads and the second leg extending directly under at least two termination pads.

5. A suspension for a slider for use in a disk drive comprising:
   a plurality of slider connection pads positioned in a head area of the suspension;
   a plurality of termination pads positioned in a tail area of the suspension;
   a plurality of electrically conductive traces that are separated by dielectric material and extend from the tail area to the head area that respectively provide electrical connection between a selected slider connection pad and a selected termination pad; and
   a metal substrate layer extending between the head area and the tail area, the metal substrate layer serving as a ground layer and being separated from the plurality of electrically conductive traces by dielectric material and including a split-substrate segment that is divided by a slit into first and second legs, the first leg being positioned under at least one selected electrically conductive trace that conducts signals from a read head in the slider, and the second leg being positioned under at least one selected electrically conductive traces that conducts signals to a write head in the slider; and
   wherein the first and second legs of the split-substrate segment provide first and second ground current paths respectively and thereby reduce electrical interference signal transfer between the first and second legs of the split-substrate segment; and
   wherein the second leg of the split-substrate segment is positioned closer to a source of radio frequency interference than the first leg of the metal ground layer and thereby shunts radio frequency interference currents away from the first leg of the split-substrate segment.

6. A suspension for a slider for use in a disk drive comprising:
   a plurality of slider connection pads positioned in a head area of the suspension;
   a plurality of termination pads positioned in a tail area of the suspension;
   a plurality of electrically conductive traces that are separated by dielectric material and extend from the tail area to the head area that respectively provide electrical connection between a selected slider connection pad and a selected termination pad; and
   a metal substrate layer extending between the head area and the tail area, the metal substrate layer serving as a ground layer and being separated from the plurality of electrically conductive traces by dielectric material and including a split-substrate segment that is divided by a slit into first and second legs, the first leg being positioned under at least one selected electrically conductive trace that conducts signals from a read head in the slider, and the second leg being positioned under at least one selected electrically conductive traces that conducts signals to a write head in the slider; and
   wherein the first and second legs of the split-substrate segment provide first and second ground current paths respectively and thereby reduce electrical interference signal transfer between the first and second legs of the split-substrate segment; and
   wherein one of the selected traces that conduct signals from the read head in the slider extends along a first path between a selected slider connection pad and a selected termination pad and has a first length measured along the first path and the split-substrate segment extends along a second path parallel to first path and has a second length that is at least fifty percent of the first length.

7. A suspension for a slider for use in a disk drive comprising:
   a plurality of slider connection pads positioned in a head area of the suspension;
   a plurality of termination pads positioned in a tail area of the suspension;
   a plurality of electrically conductive traces that are separated by dielectric material and extend from the tail area to the head area that respectively provide electrical connection between a selected slider connection pad and a selected termination pad; and
   a metal substrate layer extending between the head area and the tail area, the metal substrate layer serving as a ground layer and being separated from the plurality of electrically conductive traces by dielectric material and including a split-substrate segment that is divided by a slit into first and second legs, the first leg being positioned under at least one selected electrically conductive trace that conducts signals from a read head in the slider, and the second leg being positioned under at least one selected electrically conductive traces that conducts signals to a write head in the slider; and wherein the first and second legs of the split-substrate segment provide first and second ground current paths respectively and thereby reduce electrical interference signal transfer between the first and second legs of the split-substrate segment; and wherein the split-substrate segment extends into the tail area with the second leg of the split-substrate segment extending beyond the first leg of the split-substrate segment toward a source of radio frequency interference and being positioned between the source of radio frequency interference and the first leg of the metal substrate layer so that radio frequency interference currents are shunted away from the first leg of the split-substrate segment.

8. A disk drive comprising:
a slider with a read head and a write head; and
a suspension supporting and providing electrical connections to the slider, the suspension including:
a plurality of termination pads positioned in a tail area of the suspension;
a plurality of electrically conductive traces, which are separated by dielectric material, extending from the tail area of the suspension to a head area of the suspension where the slider is mounted, each electrically conductive trace respectively providing electrical connection between a selected slider connection pad in the head area and a selected termination pad in the tail area; and
a metal substrate layer extending between the head area and the tail area, the metal substrate layer serving as a ground layer and being separated from the plurality of electrically conductive traces and the plurality of termination pads by dielectric material and including a split-substrate segment that is divided by a slit into first and second legs, the first leg being positioned directly under at least one selected electrically conductive trace that conduct signals from the read head in the slider, and the second leg being positioned directly under at least one selected electrically conductive trace that conducts signals to the write head in the slider; and
wherein the first and second legs of the split-substrate segment provide first and second ground current paths respectively and thereby reduce electrical interference signal transfer between the first and second legs of the split-substrate segment.

9. The disk drive of claim 8 wherein the split-substrate segment extends at least from the tail area adjacent to the plurality of termination pads along a substantial portion of the length of the metal substrate layer between a selected one of the termination pads and a selected one of the slider connection pads.

10. The disk drive of claim 8 wherein the split-substrate segment extends into the tail area and is disposed under at least two termination pads in the tail area.

11. The disk drive of claim 8 wherein the split-substrate segment extends into the tail area with the first leg extending under at least two termination pads and the second leg extending under at least two termination pads.

12. The disk drive of claim 8 wherein the first leg of the split-substrate segment is connected to a preamp signal return and the second leg of the split-substrate segment is connected to a baseplate ground.

13. A disk drive comprising:
a slider with a read head and a write head; and
a suspension supporting and providing electrical connections to the slider, the suspension including:
a plurality of electrically conductive traces, which are separated by dielectric material, extending from a tail area of the suspension to a head area of the suspension where the slider is mounted, each electrically conductive trace respectively providing electrical connection between a selected slider connection pad in the head area and a selected termination pad in the tail area; and
a metal substrate layer extending between the head area and the tail area, the metal substrate layer serving as a ground layer and being separated from the plurality of electrically conductive traces by dielectric material and including a split-substrate segment that is divided by a slit into first and second legs, the first leg being positioned under at least one selected electrically conductive trace that conduct signals from the read head in the slider, and the second leg being positioned under at least one selected electrically conductive trace that conducts signals to the write head in the slider; and
wherein the first and second legs of the split-substrate segment provide first and second ground current paths respectively and thereby reduce electrical interference signal transfer between the first and second legs of the split-substrate segment; and
wherein the second leg of the split-substrate segment is positioned closer to a source of radio frequency interference than the first leg of the metal substrate layer and thereby shunts radio frequency interference currents away from the first leg of the split-substrate segment.

14. A disk drive comprising:
a slider with a read head and a write head; and
a suspension supporting and providing electrical connections to the slider, the suspension including:
a plurality of electrically conductive traces, which are separated by dielectric material, extending from a tail area of the suspension to a head area of the suspension where the slider is mounted, each electrically conductive trace respectively providing electrical connection between a selected slider connection pad in the head area and a selected termination pad in the tail area; and
a metal substrate layer extending between the head area and the tail area, the metal substrate layer serving as a ground layer and being separated from the plurality of electrically conductive traces by dielectric material and including a split-substrate segment that is divided by a slit into first and second legs, the first leg being positioned under at least one selected electrically conductive trace that conduct signals from the read head in the slider, and the second leg being positioned under at least one selected electrically conductive trace that conducts signals to the write head in the slider; and
wherein the first and second legs of the split-substrate segment provide first and second ground current paths respectively and thereby reduce electrical interference signal transfer between the first and second legs of the split-substrate segment; and
wherein a selected electrically conductive trace that conducts signals from the read head in the slider extends along a first path between a selected slider connection pad and a selected termination pad and has a first length measured along the first path and the split-substrate segment extends along a second path parallel to first path and has a second length that is at least fifty percent of the first length.

15. A disk drive comprising:
a slider with a read head and a write head; and
a suspension supporting and providing electrical connections to the slider, the suspension including:
a plurality of electrically conductive traces, which are separated by dielectric material, extending from a tail area of the suspension to a head area of the suspension where the slider is mounted, each electrically conductive trace respectively providing electrical connection between a selected slider connection pad in the head area and a selected termination Dad in the tail area; and
a metal substrate layer extending between the head area and the tail area, the metal substrate layer serving as a ground layer and being separated from the plurality of electrically conductive traces by dielectric material and including a split-substrate segment that is divided by a slit into first and second legs, the first leg being positioned under at least one selected electrically conductive trace that conduct signals from the read head in the slider, and the second leg being positioned under at least one selected electrically conductive trace that conducts signals to the write head in the slider; and
wherein the first and second legs of the split-substrate segment provide first and second ground current paths respectively and thereby reduce electrical interference signal transfer between the first and second legs of the split-substrate segment; and
wherein the split-substrate segment extends into the tail area with the second leg of the split-substrate segment extending beyond the first leg of the split-substrate segment toward a source of radio frequency interference and being positioned between the source of radio frequency interference and the first leg of the metal substrate layer so that radio frequency interference currents are shunted away from the first leg of the split-substrate segment.

16. The disk drive of claim 15 wherein the first leg of the split-substrate segment is connected to a preamp signal return and the second leg of the split-substrate segment is connected to a baseplate ground.

* * * * *

UNITED STATES PATENT AND TRADEMARK OFFICE
CERTIFICATE OF CORRECTION

| | | |
|---|---|---|
| PATENT NO. | : 9,117,469 B1 | Page 1 of 1 |
| APPLICATION NO. | : 14/557380 | |
| DATED | : August 25, 2015 | |
| INVENTOR(S) | : John Contreras et al. | |

It is certified that error appears in the above-identified patent and that said Letters Patent is hereby corrected as shown below:

In the Claims

Claim 15, at column 11, line 11, the word 'Dad' should read --pad--.

Signed and Sealed this
Nineteenth Day of April, 2016

Michelle K. Lee
*Director of the United States Patent and Trademark Office*